P. C. DAY.
LUBRICATING SYSTEM.
APPLICATION FILED DEC. 13, 1918.
1,334,844.
Patented Mar. 23, 1920.
3 SHEETS—SHEET 1.
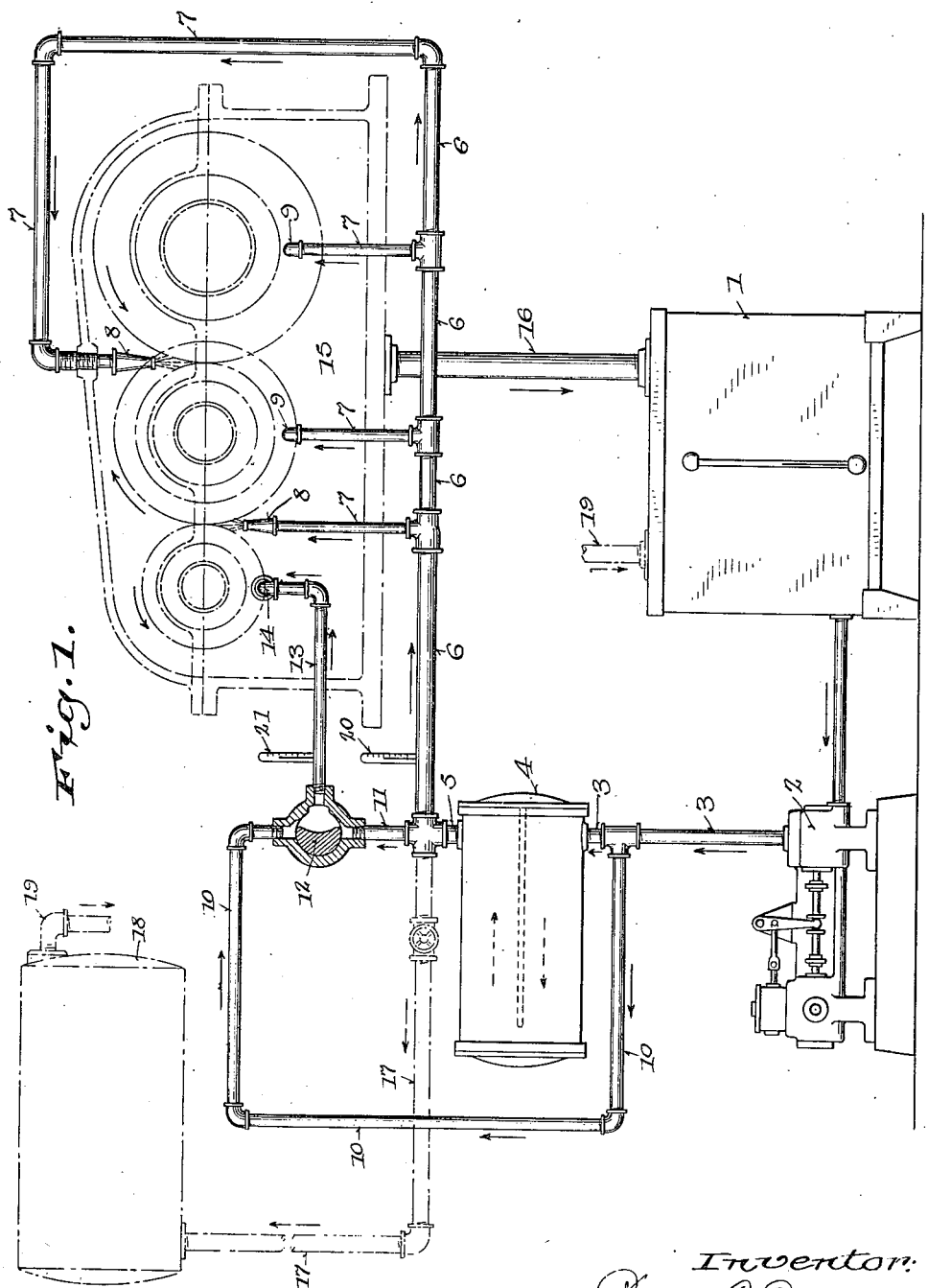

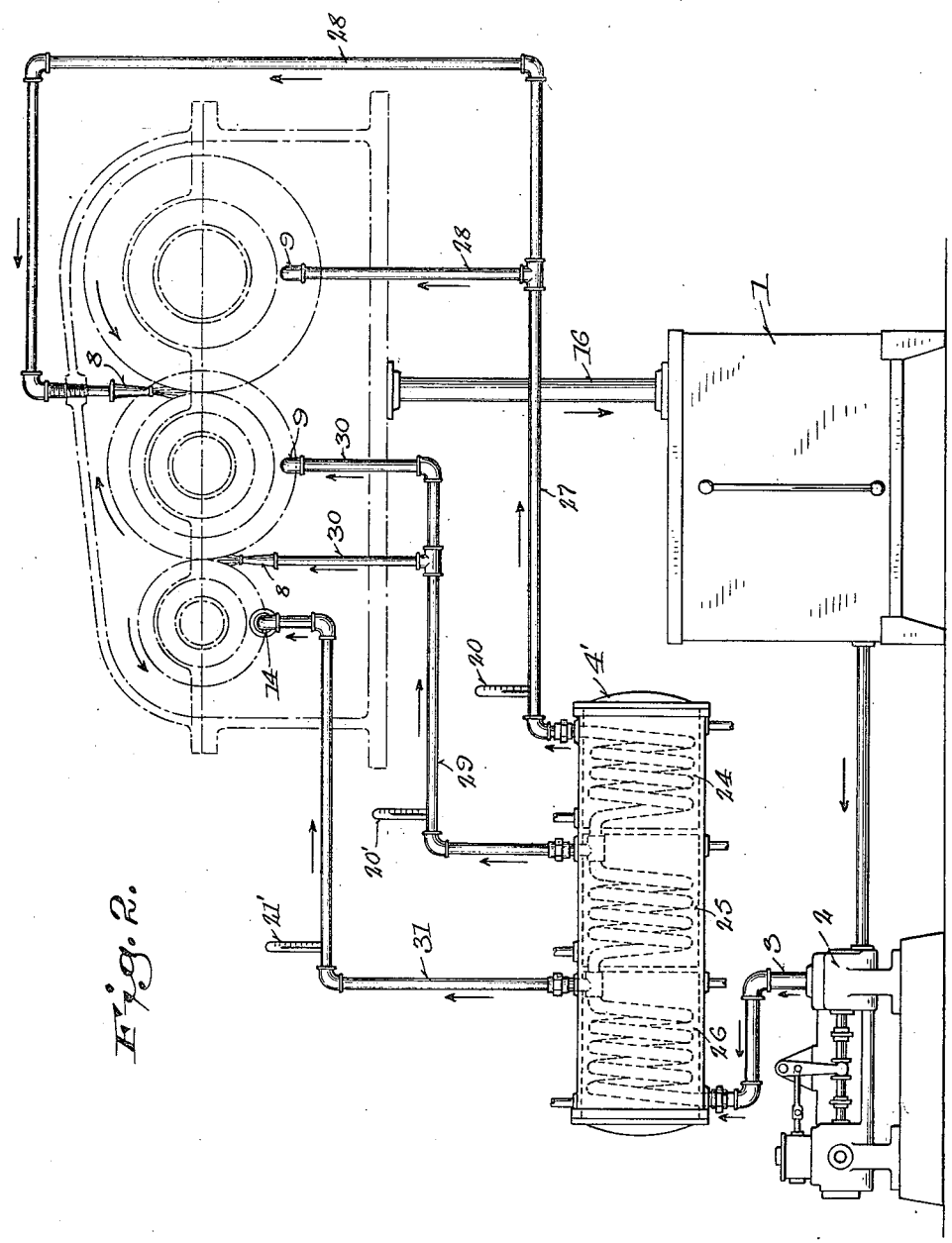

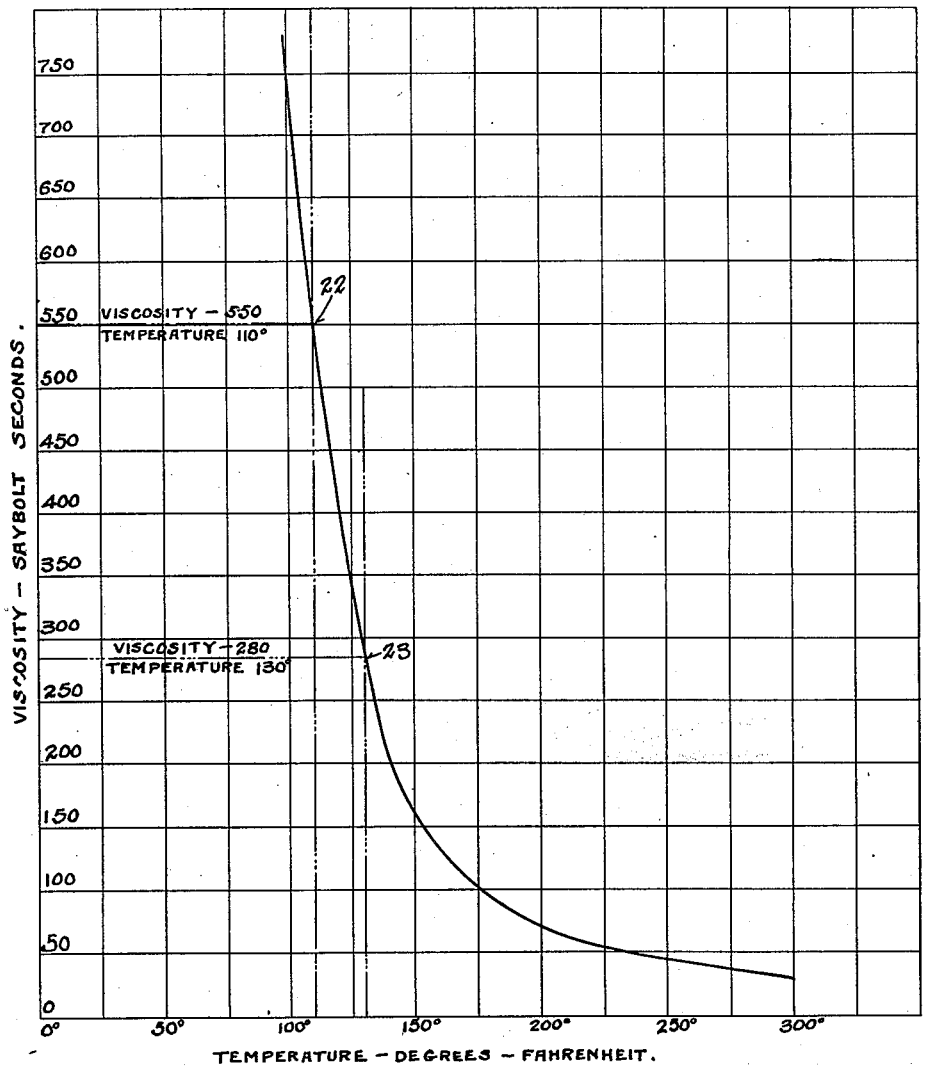

UNITED STATES PATENT OFFICE.

PERCY C. DAY, OF MILWAUKEE, WISCONSIN.

LUBRICATING SYSTEM.

1,334,844.  Specification of Letters Patent.  Patented Mar. 23, 1920.

Application filed December 13, 1918. Serial No. 266,524.

*To all whom it may concern:*

Be it known that I, PERCY C. DAY, a subject of the Kingdom of Great Britain, residing at Milwaukee, in the county of Milwaukee and State of Wisconsin, have invented certain new and useful Improvements in Lubricating Systems, of which the following is a specification, reference being had to the accompanying drawing, forming a part thereof.

This invention relates more particularly to means for supplying lubricant from a single source to parts requiring lubrication of different kinds or degrees of viscosity or fluidity, such as turbine gear units.

The main objects of the invention are to vary the temperature and hence the viscosity or fluidity of oil supplied from a common source to bearings, gears or parts requiring lubrication of different kinds or degrees of viscosity characteristics, to simplify the construction of speed changing gear units, and generally to improve the construction and operation of devices of this class.

The invention consists in the construction, arrangement and combination of parts as hereinafter particularly described and pointed out in the appended claims.

In the accompanying drawing like characters designate the same or similar parts in the several figures.

Figure 1 is a diagrammatic illustration of a typical lubricating system for a double reduction gear unit for connecting a high speed turbine with a low speed propeller; Fig. 2 is a similar illustration of a modification; and Fig. 3 is a diagram showing the temperature and viscosity curve of a special heavy oil suitable for the type of installation illustrated in Figs. 1 and 2.

When a steam turbine is employed as a prime mover for driving the propeller of a ship or for many other purposes, it is generally necessary to introduce some form of speed reducing mechanism between the turbine, which usually revolves at high speed, and the propeller or other driven mechanism, which is required to revolve at a lower speed than the turbine.

The usual form of speed reducing mechanism employed for this purpose, is a gear unit comprising one or more trains of helical gears with their necessary supporting shafts and bearings, mounted in a frame or housing which serves to support the bearings and to inclose the mechanism.

The gear unit is an assemblage of apparatus, including several shaft journals which revolve at different speeds, and one or more trains of gears.

The bearings and gears are usually lubricated by a force-feed system of oil supply, by means of which a quantity of oil is kept in circulation and is distributed under pressure to the different bearings and to the gear teeth.

In order to simplify the construction of the gear unit, it is desirable that the lubrication of all bearings and gears shall be effected by a single system, which will distribute oil to all parts to be lubricated from a single source. An installation of this character, however, should comprise parts which operate under widely different conditions, requiring lubrication of different kinds or degrees of viscosity.

The present invention consists in apparatus by which oil can be circulated from a single source and yet its character as to its viscosity or fluidity may be varied at different points of distribution to suit the different requirements due to the different conditions at such points, and is specially adapted for use in connection with turbines and gear units employed for ship propulsion.

In an installation such as is illustrated in Fig. 1 or Fig. 2, it is common practice to employ a turbine which revolves at from 3,000 to 4,000 revolutions per minute, with a double train of herringbone or helical gears, reducing the speed, say from 60 to 100 revolutions per minute for the propeller shaft.

The turbine shaft and first motion pinion shaft coupled therewith, will revolve in their bearings with rubbing contact at speeds which may average between 60 and 120 feet per second.

The intermediate or second motion gear shaft will revolve in its bearings with a rubbing contact at a speed which may average from 15 to 30 feet per second.

The main shaft will revolve in its bearings with a rubbing contact which may average from 4 to 8 feet per second.

The first motion helical gears will revolve at peripheral speeds which may average from 50 to 200 feet per second.

The second motion helical gears will revolve at peripheral speeds which may average from 15 to 45 feet per second.

The function of the lubricant is to maintain a film of oil at all times between metallic surfaces which would otherwise rub or roll on each other under the pressure due to the power transmitted and to the weight of the parts.

A continuous film of oil must be maintained between the shaft journals and the bearings which support them.

Oil films must also be maintained along the lines of contact between the teeth of driving and driven gears.

The necessary conditions for maintaining unbroken oil films in low speed bearings and between gear teeth revolving at moderate speeds under pressure, are sufficient viscosity of the oil and sufficient volume of oil to keep the clearance spaces filled, notwithstanding the pressure exerted between the parts which tends to squeeze out the oil and allow the metallic surfaces to make direct contact with each other.

The same conditions have to be met in the high speed bearings and gears, but they revolve at higher speeds, with proportionately lower pressures, and can be lubricated more efficiently with oil of lower viscosity than is best adapted to the requirements of the low speed bearings and gears.

In the case of the double reduction marine turbine gear unit as illustrated in Fig. 1 or Fig. 2, there exists an extreme difference in operating conditions between the high speed bearings of the turbine and first motion pinion shafts, and the teeth of the second motion or slow speed train of gears.

The high speed journals may revolve at speeds between 60 and 120 feet per second, under a pressure between 50 and 150 pounds per square inch.

The oil supplied to these journals should have a relatively low viscosity in order to allow a sufficient volume thereof to enter the bearings for maintaining therein an unbroken film, keeping the temperature down within safe limits and avoiding excessive friction loss in these bearings, which would be unnecessarily high if the viscosity of the oil were too great. The friction loss in such high speed bearings is very important, because it constitutes the greatest single item of mechanical loss in the entire transmission.

The low speed gears may revolve at pitch line speeds between 15 and 45 feet per second, with teeth in intermittent contact along very narrow "surfaces of contact," under pressures which may average between 500 and 1500 pounds per inch of gear face, corresponding to several thousands of pounds per square inch of actual contact surface between the teeth.

The contact between the teeth is partly rolling and partly sliding, but the sliding velocity is always low and in no way comparable with the rubbing speeds of the high speed bearings. The oil supplied to these low speed gears should be of relatively high viscosity in order that it may fulfil its function of keeping the metallic surfaces of the gear teeth out of contact with each other.

Between these extremes lie the first motion gears and second and third motion bearings, all of which may require oil of different viscosities if considered from a theoretical standpoint. In practice, however, it has been found satisfactory in most cases to supply oil at one temperature and viscosity to every point in the gear unit except the high speed or first motion bearings.

Referring to Fig. 1, illustrating one embodiment of the invention, 1 designates an oil storage and settling tank or reservoir, from which oil is drawn by a pump 2, and delivered by a pipe 3 through an oil cooler 4, and by a pipe 5 to a pressure pipe or manifold 6. The oil from this manifold is distributed through branch pipes 7 to gear spray nozzles 8 and to intermediate and low speed bearings represented by the numerals 9.

A by-pass pipe 10 leading around the cooler 4, connects the pipe 3 with one side of a mixing valve 12, and delivers to this valve oil which has not passed through the cooler.

A pipe 11 delivers to the other side of the mixing valve 12, oil which has passed through the cooler and enters the valve at a lower temperature than that of the oil supplied thereto through the by-pass pipe 10.

The mixing valve 12 may be of any suitable type designed to deliver to a pipe 13, cool oil supplied by the pipe 11, and warm oil supplied by the pipe 10, mixed in any desired proportions. The mixed oil is supplied by the pipe 13 to the high speed bearings represented by the numeral 14. All of the oil supplied to the gear unit, falls into the gear case or pan 15, and is returned by a pipe 16 to the tank or reservoir 1.

A thermometer 20, connected with the manifold 6, shows the temperature of the oil delivered to the nozzles 8 and bearings 9. A thermometer 21, connected with the pipe 13, shows the temperature of the oil delivered to the high speed bearings 14.

In some cases the apparatus may be provided with a standpipe 17, connecting the pressure pipe or manifold 6 with an elevated storage tank or reservoir 18, which in turn is connected by an overflow pipe 19 with the main storage and settling tank or reservoir 1. These parts are shown by dotted lines, since they are optional features which do not affect the principle, and do not materially affect the operation of the system.

Under normal working conditions, the temperature of the oil in the tank or reservoir may be about 135° Fahrenheit. The temperature of the oil leaving the cooler at 5, may be 110° F. corresponding with the point 22 on the viscosity curve, Fig. 3. The oil will then be delivered at this temperature to the spray nozzles 8 and to the intermediate and low speed bearings 9. The viscosity of this oil is about 550 Saybolt seconds, as shown on the diagram, Fig. 3.

The oil supplied to the mixing valve 12 by the pipe 10 will have a temperature approximately the same as that in the tank 1, or about 135° F. The oil supplied to the mixing valve by the pipe 11 will have a temperature of approximately 110° F.

The mixing valve may be regulated so that the mixed oil supplied thereto by the pipes 10 and 11 will be delivered therefrom through the pipe 13 to the high speed bearings 14 at a temperature of 130° F., corresponding with the point 23 on the viscosity curve, Fig. 3. The corresponding viscosity of the oil entering the high speed bearings at 14 is approximately 280 Saybolt seconds, as shown by the diagram, Fig. 3.

From the foregoing assumptions it will be seen that the viscosity of the oil supplied to the high speed bearings can be reduced to about one-half of the viscosity of the oil supplied to the rest of the gear unit by mixing warm oil from the tank or reservoir 1, with cool oil from the cooler 4, so as to maintain a difference of about 20° F. between the oil in the pressure pipe or manifold 6 and the oil in the delivery pipe 13.

The thermometers 20 and 21 serve to indicate these temperatures and to guide the operator in the adjustment of the mixing valve 12.

It is to be understood that the actual temperatures of operation and the grade of oil used may be varied according to varying conditions, and the temperatures and viscosities above mentioned are merely illustrative.

In the apparatus described and illustrated in Fig. 1, provision is made for only two different temperatures of oil, but it is obvious that a greater number of different temperatures may be obtained by providing separate distributing pipes to the nozzles 8 or the bearings 9, or any desired number and arrangement of nozzles and bearings, with a corresponding increase in the number of mixing valves.

Different means may be provided for varying the temperature and hence the viscosity of the oil supplied from a common source, such as the tank or reservoir 1, to different parts such as the bearings and gears of speed-change gearing, as for example, in place of a mixing valve or valves, a number of separate coolers or a cooler comprising a number of separate compartments or sections, may be used.

As shown in Fig. 2, a cooler 4' is formed or provided with a number of separate sections 24, 25 and 26, adapted to cool the warm oil taken from the tank or reservoir 1, to different temperatures as required by the different parts of the gear unit. The cooler is connected at one end with the discharge pipe 3 of the pump 2; the section 24 is connected by a delivery pipe or conduit 27 and branch pipes or conduits 28 with the low speed bearings 9 and the second motion gear spray nozzle 8; the section 25 is connected by a delivery pipe or conduit 29 and branch pipes or conduits 30 with the intermediate speed bearings 9 a? the first motion gear spray nozzle 8; and the section 26 is connected by a delivery pipe or conduit 31 with the high speed bearings 14.

The several delivery pipes leading to parts of the gearing requiring lubrication of different temperatures and viscosities, are provided as shown, with thermometers 20, 20' and 21', indicating the temperatures at which the oil is supplied to the several parts of the gearing, and to enable the operator to vary such temperatures as desired, as for example, by adjusting the supply of a cooling agent to the different sections of the cooler.

It is obvious that by means of this invention, oil may be delivered to different parts requiring lubrication of different degrees of viscosity or fluidity at different temperatures, between the temperature of the oil in the tank or reservoir 1 as the highest limit, and the temperature of the oil cooled to the lowest degree of which the cooler is capable, as the lowest limit.

Various modifications in the apparatus other than those shown and hereinbefore mentioned, may be made, without departure from the principle and scope of the invention as defined in the following claims.

I claim:

1. In a lubricating system the combination with a single source of lubricant supply, of a number of conduits for delivering lubricant from said source to parts requiring lubrication of different degrees of viscosity and means for changing the temperature and viscosity of the lubricant passing through one of said conduits relative to the temperature and viscosity of the lubricant delivered through another of said conduits.

2. In a lubricating system the combination with an oil reservoir, a number of conduits for conveying oil from the reservoir to parts requiring lubrication of different degrees of viscosity, means for varying the temperature and viscosity of the oil passing through one or more of said conduits from the common source of supply, relative to the temperature and viscosity of the oil supplied through other of said conduits, means for returning oil from the lubricated parts to the reservoir, and means for circulating oil through the system.

3. In a lubricating system the combination with an oil reservoir, of conduits for conveying oil from the reservoir to parts to be lubricated, and a cooler for reducing the temperature of the oil passing through one of the conduits below the temperature of that passing through another of said conduits.

4. In a lubricating system the combination with an oil reservoir, of conduits for conveying oil from the reservoir to parts to be lubricated, a cooler for reducing the temperature of the oil passing through some of the conduits to some of said parts, and a mixing device connected with the reservoir and with the cooler for modifying the temperature and viscosity of the oil delivered to another part.

5. In a lubricating system the combination with an oil reservoir, of conduits for conveying oil therefrom to parts requiring lubrication of different degrees of viscosity, means for cooling the oil for some of said parts, and means for variably mixing warm oil from the reservoir and cool oil from the cooling means for other parts.

6. In a lubricating system the combination with an oil reservoir, of conduits for conveying oil from the reservoir to parts requiring lubrication of different degrees of viscosity, means for returning oil from said parts to said reservoir, means for circulating oil through the system, a cooler connected with the reservoir for reducing the temperature of the oil delivered to some of said parts, and a mixing valve connected with the cooler and by a by-pass with the reservoir for mixing cool oil from the cooler and warm oil from the reservoir for delivery at an intermediate temperature to another part.

7. In a lubricating system the combination with an oil reservoir, of conduits for conveying oil therefrom to parts requiring lubrication of different degrees of viscosity, a spray nozzle connected with some of said conduits, and means for changing the temperature of the oil passing through some of said conduits from the common source relative to the temperature of the oil delivered through other of said conduits.

8. In a lubricating system the combination with an oil reservoir, conduits for conveying oil therefrom to parts requiring lubrication of different degrees of viscosity, means for returning oil from said parts to the reservoir, a pump for circulating the oil through the system, an elevated tank connected with the delivery side of the system and having an overflow connection with the reservoir, and means for changing the temperature of the oil passing through some of the conduits whereby oil is supplied from the common source to different parts at different temperatures.

9. In a lubricating system the combination of an oil reservoir, conduits for conveying oil therefrom to parts requiring lubrication of different degrees of viscosity, a pump for forcing oil from the reservoir to said parts, a return conduit from said parts to the reservoir, a cooler arranged to reduce the temperature of the oil delivered to some of the parts, and a mixing valve connected with the cooler and a by-pass with the reservoir for varying the temperature of the oil delivered to other parts.

In witness whereof I hereto affix my signature.

PERCY C. DAY.